J. A. WHERRY.
FISHING REEL.
APPLICATION FILED MAR. 18, 1919.

1,347,529.

Patented July 27, 1920.

Inventor:
John A. Wherry
by O. C. Stickney
Attorney

UNITED STATES PATENT OFFICE.

JOHN A. WHERRY, OF NEW ORLEANS, LOUISIANA.

FISHING-REEL.

1,347,529.

Specification of Letters Patent.  Patented July 27, 1920.

Application filed March 18, 1919. Serial No. 283,402.

*To all whom it may concern:*

Be it known that I, JOHN A. WHERRY, a citizen of the United States, residing in New Orleans, in the parish of Orleans and State of Louisiana, have invented certain new and useful Improvements in Fishing-Reels, of which the following is a specification.

This invention relates to fishing-reels, and its object is to provide means for controlling the movements thereof.

In the preferred form of the invention, the reel is frictionally held against accidental movement in either winding or unwinding direction. The line is prevented from becoming loose on the reel.

This friction device or brake does not prevent the crank from winding the reel when desired; and a further feature of the invention resides in the provision of means for automatically releasing the friction device when the reel is turned rapidly by the crank, so that the line may be wound up without the necessity of overcoming the drag caused by the friction device.

Still another feature of improvement resides in means coming automatically into play when the reel reaches a high velocity of revolution, for frictionally opposing rotation of the reel so as to prevent its speed from becoming unduly high.

Other features and advantages will hereinafter appear.

In the accompanying drawings,

Figure 1 shows inner edges or shoes upon the weights as normally held by springs in frictional engagement with a fixed collar or boss at the center of the drum, to hold the reel frictionally against accidental movement, and to oppose rotation of the reel when turned at low speed. Upon winding the reel rapidly, centrifugal force carries the weights away from the central friction collar or hub, thus releasing the reel for free winding. When the reel revolves at high velocity as the line pays off therefrom, the weights fly still farther out, and their outer edges or shoes engage the inner periphery of the drum, to check excessive speed of the reel.

Figure 1:
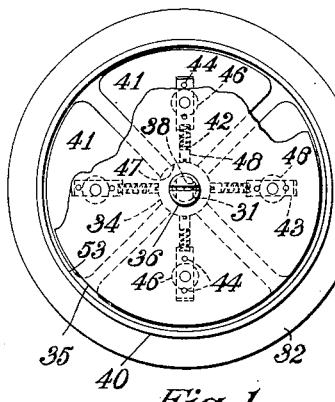
Figure 2:
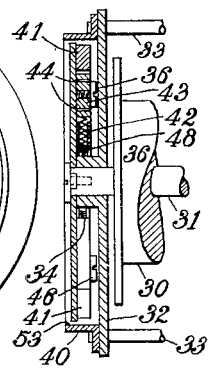
Fig. 2 is a sectional elevation of the device seen at Fig. 1, the friction collar being shown as integral with the stationary side of the drum in which the reel is mounted.
Figure 3:
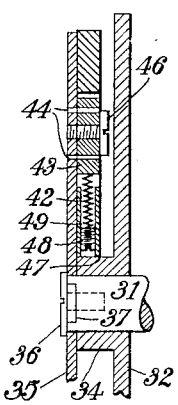
Fig. 3 is a perspective view to illustrate one of the weights with inner and outer friction edges or shoes, seen at Figs. 1 and 2, together with springs therefor.
Figure 4:
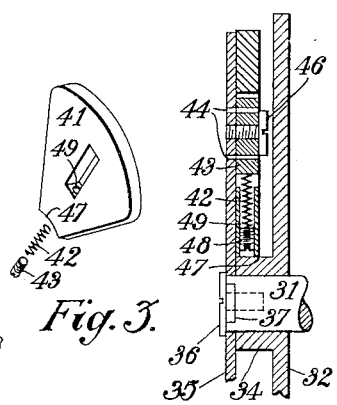
Fig. 4 is a sectional elevation, showing enlarged details of the device seen at Fig. 1.

The reel 30 is mounted upon a shaft 31 whose ends are journaled in a frame comprising plates or sides 32 and tie-rods 33. In Figs. 2 and 4, the shaft 31 extends through a boss or collar 34 fixed to one of the side plates 32; and upon the projecting end of the shaft a disk 35 is fixed by a screw 36, the shaft being flat or cut away upon opposite sides at 37. This disk 35 has a correspondingly shaped oblong hole 38, Fig. 1. The disk 35 rotates with the shaft 31 and reel 30. This rotating disk 35, which may serve as the cover for a drum 40, carries centrifugal weights 41, which are normally held by springs 42 in frictional engagement with the fixed boss or collar 34. There are four of these weights, and they are guided upon oblong blocks 43 secured by pins 44 to the inner face of the disk 35, and permitting radial outward and inward movement of the weights 41; the springs 42 returning them from their outer positions to their inner positions against the stationary boss 34. The heads of screws 46 confine the weights, which, at their inner ends, are curved at 47 to form shoes to fit the boss 34, which serves as a friction boss or collar; these four friction shoes being sufficient to hold the reel normally against accidental rotation. The compression springs 42 bear against guide blocks 43, and at their outer ends bear against screws 48, which are threaded into holes 49 formed radially in the weights 41, whereby the tension of the springs may be adjusted.

Upon rotating the reel by its crank, the centrifugal force causes the weights 41 to overcome the power of the springs 42, and to move radially away from the friction collar 34, thereby releasing the reel, so that it will turn easily, thus minimizing the labor of winding in the line.

When, however, the reel is rotated at very high velocity during the paying out of the line when being cast, or after a fish is caught, the weights 41 still further overcome the tension of the springs 42, and hence fly farther out, until they engage in the inner periphery of the wall of the drum 40, and hence prevent rotation at exceedingly high rate. The weights are made of segment shape, each one being about in the form of a quadrant, so that it has a broad guiding surface to rest upon the disk 35, and so that it will have long and efficient bearing edges or shoes to contact with the inner periphery 53 of the drum 40. As soon as the unwinding speed slackens, the spring 42 returns the weights to normal positions, frictionally engaging the central boss 34.

Figure 5:
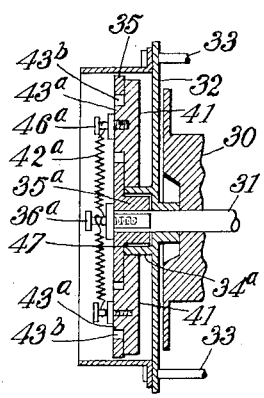
Fig. 5 is a view similar to Fig. 1, showing the weights provided with integral guide blocks and returning springs located outside of the carrying disk for holding the weights against the friction hub or bars.

Fig. 5 is a side view of a construction in all respects, as to its operation, like Fig. 2, but having the weights 41 formed with integral projections 43ª, which are guided in slots 43ᵇ. The disk 35 is provided with a hub 35ª extending inward, and affords a long bearing to hold the same on the shaft 31. The hole in the hub is oblong to prevent rotation of the disk 35 on the shaft. The disk 35 is held in place by a specially shaped screw 36ª for the reception of pull springs 42ª that reach to the screws 46ª. The latter also hold the weights in the slots 43ᵇ. This construction enables access to all the parts from the outside of the drum 40. The side wall 32 also has a hollow boss 34ª extending outward, to afford a frictional contact with the inner curved surfaces or shoes 47 of the weights. This boss is made hollow to give room for the hub 35ª, and conduce to compactness.

Thus it will be seen that the reel is normally held yieldingly against rotation in either direction, and that when it is being wound by the crank this friction is automatically released, and further that when the reel is being rotated at high velocity by the line pulling thereon, the speed of the reel is automatically checked or governed; and that these results are accomplished by inexpensive mechanism, which is very light, compact, durable and not liable to get out of order, while affording any desired adjustment of the governor springs, which are rendered accessible by taking out the screw 36 and removing the governor disk 35 from the reel shaft 31; the governor weights being confined between said disk and the plate 32, which forms one end of the reel frame or casing.

Figure 6:
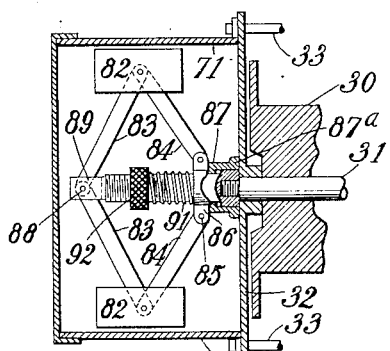
Fig. 6 shows a form of governor in which the weights are mounted at the ends of toggles and placed near the inner periphery of the drum, so that, upon flying out, they engage the periphery to retard the reel. The reel is retarded by the governor when turning slowly.

At Fig. 6, combined governor weights and friction shoes 82 are adapted to bear directly against the inner face 71 of drum 72. These weights are pivoted upon arms 83, 84. Each pair of arms forms a toggle. One end of each toggle is pivoted at 85, ears 86 being provided for this purpose upon a short sleeve 87, which is carried by the extension 89 of the reel shaft 31. The other arms 83 of the toggles are pivoted at 88 in the bifurcated free end of said shaft 89. The sleeve 87, carrying the ears 86, is held under pressure by a spring 91 surrounding the extension shaft 89. The tension of the spring is regulated by a nut 92 threaded upon the shaft 89. As the speed of the reel increases, the weights or shoes 82 fly out, thus tending to close the toggles and forcing the movable sleeve 87 outwardly or to the left against the tension of the spring 91, until the weights themselves contact with the periphery 71 of the drum to check the speed of the reel, said drum fixed to plate 32 of the reel frame. Normally, spring 91 presses the large end 87ª of sleeve 87 against fixed plate 32, to retard reel rotation until speed increases so much that centrifugal weights 82 withdraw sleeve 87 from plate 32.

Variations may be resorted to within the scope of the invention, and portions of the improvements may be used without others.

Having thus described my invention, I claim:

1. In a fishing-reel, the combination with winding means, of means including a centrifugally-releasable device for frictionally opposing the rotation of the winding means.

2. In a fishing-reel, the combination with winding means, of a friction-brake to oppose the rotation of the winding means, and means dependent upon centrifugal action for relieving the winding means from the control of the brake.

3. In a fishing-reel, the combination with winding means, of a friction-shoe, a centrifugal weight therefor, a spring opposing said weight, a part with which said shoe frictionally coöperates, said spring operating to hold said shoe and said part together, and centrifugal means for relieving the friction.

4. In a fishing-reel, the combination with winding means, of a governor device, including an adjustably tensioned spring, and means controlled thereby for retarding the winding means when it is revolved slowly, centrifugal means being provided for relieving the spring tension.

5. In a fishing-reel, the combination with winding means, of friction means normally opposing the rotation of the winding means, means dependent upon the rotation of the winding means for relieving said friction means to permit the winding means to turn freely, and means brought into action by rotation of the winding means at still higher velocity for opposing the rotation thereof.

6. In a fishing-reel, the combination with winding means and a shaft, of friction means normally opposing the rotation of the shaft, means dependent upon the rotation of the shaft for relieving said friction means to permit the shaft to be turned freely, and means, including a friction-shoe and a centrifugal weight therefor, brought into action by rotation of the shaft at still higher velocity for opposing the rotation thereof.

7. In a fishing-reel, the combination with means for winding the reel including a shaft, of centrifugal mechanism for opposing the rotation of the shaft both at low speed and at high velocity while releasing the shaft from retardation when turned at intervening speeds.

8. In a fishing-reel, the combination with a shaft, of centrifugal mechanism for opposing the rotation of the shaft both at low speed and at high velocity while releasing the shaft from retardation when turned at intervening speeds, said centrifugal mechanism including a weight and shoes connected therewith, one shoe for retarding the rotation at low velocity, and the other shoe for retarding the rotation at high velocity.

9. In a fishing-reel the combination of a shaft, centrifugal mechanism for opposing the rotation of the shaft both at low speed and at high velocity while releasing the shaft from retardation when turned at intervening speeds, said centrifugal mechanism including a weight and shoes connected therewith, one shoe for retarding the rotation at low velocity, and the other shoe for retarding the rotation at high velocity, and a returning spring for said weight, effective to bring into use the low-speed shoe.

10. In a fishing-reel the combination of a shaft, friction means normally opposing the rotation of the shaft, means dependent upon the rotation of the shaft for relieving said friction means to permit the shaft to be turned freely, and means, including friction-shoes and centrifugal weights therefor, brought into action by rotation of the shaft at still higher velocity for opposing the rotation thereof.

11. In a fishing-reel the combination of a shaft, centrifugal mechanism for opposing the rotation of the shaft both at low speed and at high velocity while releasing the shaft from retardation when turned at intervening speeds, said centrifugal mechanism including weights and sets of shoes connected therewith, one set of shoes for retarding the rotation at low velocity, and the other set of shoes for retarding the rotation at high velocity.

12. In a fishing-reel the combination of a shaft, centrifugal mechanism for opposing the rotation of the shaft both at low speed and at high velocity while releasing the shaft from retardation when worked at intervening speeds, said centrifugal mechanism including weights and sets of shoes connected therewith, one set of shoes for retarding the rotation at low velocity, and the other set of shoes for retarding the rotation at high velocity, and returning springs for said weights, effective to bring into use the low-speed shoes.

13. In a fishing-reel, the combination of a shaft, a set of centrifugal weights having inner and outer shoes, a friction-boss or collar, springs holding said inner shoes against said friction-boss or collar, said weights effective by centrifugal force to withdraw said inner shoes from contact with the collar when the shaft is revolved at low speed, and a drum against whose periphery the outer shoes are driven by centrifugal force when the shaft is revolved at high velocity.

14. In a fishing-reel, the combination of a shaft, a plate upon said shaft, centrifugal weights guided upon said plate, said weights having inner shoes, a stationary device, yielding means for normally holding the shoes against said stationary device, for retarding the rotation of the shaft, said weights movable by centrifugal force to release said shoes when the shaft is rotated at moderate speed, and means to coöperate with the weights when the latter are driven out by excessively high velocity, to retard the shaft.

15. In a fishing-reel, the combination of a shaft, winding means therefor, a set of centrifugal weights having shoes, a friction-boss or collar, and springs holding said shoes against said friction-boss or collar, said weights effective by centrifugal force to withdraw said shoes from contact with the collar when the shaft is revolved at low speed.

16. In a fishing-reel, the combination of a shaft, a plate upon said shaft, centrifugal weights guided upon said plate, said weights having inner and outer shoes, a stationary device, yielding means for normally holding the inner shoes against said stationary device, for retarding the rotation of the shaft, said weights movable by centrifugal force to release said inner shoes when the shaft is rotated at moderate speed, and means to coöperate with the outer shoes when the latter are driven out by excessively high velocity, to retard the shaft.

17. In a fishing-reel, the combination of a shaft, a frame including a plate in which said shaft is journaled, a disk mounted for revolution with said shaft, said disk having a hub upon said shaft, a screw threaded into the end of said shaft to secure said disk thereon, a fixed boss upon said frame plate surrounding said hub, centrifugal weights mounted upon said disk, and springs connected to said weights to oppose centrifugal action, said weights having shoes or surfaces to bear against said fixed boss to oppose the rotation of the shaft.

18. In a fishing-reel, the combination of a shaft, a frame including a plate in which said shaft is journaled, a disk mounted for revolution with said shaft, said disk having a hub upon said shaft, a screw threaded into the end of said shaft to secure said disk thereon, a fixed boss upon said frame plate surrounding said hub, centrifugal weights mounted upon said disk, springs connected to said weights to oppose centrifugal action, said weights having shoes or surfaces to bear against said fixed boss to oppose the rotation of the shaft, said disk having guide-slots, and said weights having blocks thereon to work in said guide-slots, and a drum against whose inner periphery the weights engage by centrifugal force when the shaft is rotated at high velocity.

19. In a fishing-reel, the combination of a shaft, a drum, a disk within the drum, said disk connected to the shaft to revolve therewith, outer friction-shoes carried upon the disk, centrifugal weights for said friction-shoes, and springs to oppose said weights, and said shoes normally out of engagement with the periphery of said drum, but constructed to fly out into engagement therewith when the shaft is rotated at high velocity by the pull of the line thereon, said weights in the form of segments having friction-surfaces or shoes at their inner ends.

20. In a fishing-reel, the combination of a shaft, a drum connected thereto, a disk within the drum, said disk connected to the shaft to revolve therewith, centrifugal weights, springs to oppose said weights, and said weights normally out of engagement with the periphery of said drum, but constructed to fly out into engagement therewith when the shaft is rotated at high velocity by the pull of the line thereon, said weights in the form of segments having friction-surfaces or shoes at their inner ends, and a boss or collar normally engaged by said inner shoes, said weights having friction-surfaces or shoes at their outer ends to engage the periphery of said drum.

21. In a fishing-reel, the combination of a shaft, a drum connected thereto, a disk within the drum, said disk connected to the shaft to revolve therewith, centrifugal weights, springs to oppose said weights, and said weights normally out of engagement with the periphery of said drum, but constructed to fly out into engagement therewith when the shaft is rotated at high velocity by the pull of the line thereon, said weights in the form of segments having friction-surfaces or shoes at their inner ends, a boss or collar normally engaged by said inner shoes, said weights having friction-surfaces or shoes at their outer ends to engage the periphery of said drum, and adjustable springs for said weights.

22. In a fishing-reel, the combination with a shaft, of means coöperating therewith whereby the shaft is retarded by constant spring tension when running at low speed, and whereby the shaft is released by centrifugal force when running at a higher speed, and whereby the shaft is retarded by centrifugal force when running at a still higher speed.

JOHN A. WHERRY.

Witnesses:
St. Clair Adams,
J. N. Swing.